May 23, 1967 H. J. CALHOUN 3,321,644
CONTROL DEVICE TO PROVIDE RAPID TURN-ON POTENTIAL
FOR SCR IN RESPONSE TO INITIATING SIGNAL
Filed Dec. 30, 1964
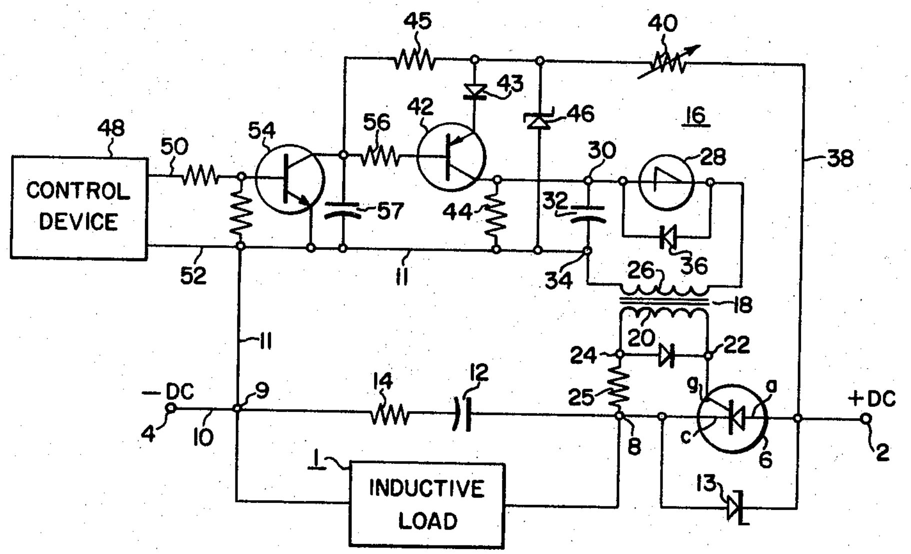
WITNESSES
Theodore F. Wrobel
James F. Young
INVENTOR
Howard J. Calhoun
BY John L. Stoughton
ATTORNEY 3,321,644
CONTROL DEVICE TO PROVIDE RAPID TURN-ON POTENTIAL FOR SCR IN RESPONSE TO INITIATING SIGNAL Howard J. Calhoun, Bernards Township, N.J., assignor to Westinghouse Electric Corporation, Pittsburgh, Pa., a corporation of Pennsylvania Filed Dec. 30, 1964, Ser. No. 422,297
7 Claims. (Cl. 307—88.5)

This application relates generally to solid state relaying apparatus and is particularly adapted for controlling a silicon controlled rectifier which controls the energy flow to a highly inductive load.

An object of this invention is to provide means for controlling the initiation of conduction of a silicon controlled rectifier.

A further object is to provide means to provide a rapid turn-on potential for a silicon controlled rectifier in response to an initiating signal.

Another object is to provide means for insuring starting of a silicon controlled rectifier from a high frequency pulse when the rectifier is connected to control the energization of a highly inductive load.

A further object of this invention is to provide means for insuring the establishment of the critical current magnitude through a discontinuous control type solid state switching device in a minimum time to permit firing of the solid state device by short duration pulses.

A still further object is to provide a control circuit utilizing inexpensive elements which may be energized from a voltage source in excess of the voltage rating of the circuit controlling elements.

Other objects of the invention will be apparent from the specification, the appended claims and the drawings in which the single figure illustrates schematically a relaying apparatus embodying the invention.

Referring to the drawings by characters of reference, numeral 1 designates generally an inductive load which is energized from direct current input terminals 2 and 4 under control of a discontinuous type solid state switching device 6 which may take the form of the well known silicon controlled rectifier which when once rendered conducting will remain conducting as long as the current therethrough remains above a minimum critical value irrespective of the termination of the conduction-initiating pulse. The anode *a* of the device 6 is connected to the positive polarity direct current terminal 2. The cathode *c* of the device 6 is connected to one load terminal 8 to which one terminal of the inductive load is connected. The other load terminal 9 is connected to the negative potential terminal 4 through the conductor 10. A Zener diode 13 is connected in anti-parallel with the device 6 to limit the potential across the device 6. A capacitor 12 is connected in series with a resistor 14 between the terminals 8 and 9 in shunt with the inductive load 1.

The gate *g* of the silicon controlled rectifier 6 is pulsed from a relaxation type oscillator circuit 16 through an isolating transformer 18. The secondary winding 20 of the transformer 18 has one terminal 22 connected to the gate *g* and its other terminal 24 through resistor 25 to the cathode *c*. The primary winding 26 has one terminal connected through a four-layer semiconductor control device 28, such as a Shockley diode, to one terminal 30 of a storage capacitor 32. The other terminal 34 of the capacitor 32 is connected to the opposite end of the primary winding 26. A diode 36 is connected in anti-parallel with the four-layer device 28 to prevent a buildup of voltage across the device 28 in the reverse direction.

The charging circuit for the capacitor 32 extends from the positive potential input terminal 2 through a conductor 38, a voltage dropping resistor 40, a switching device 42, such as a transistor, capacitor 32, and conductors 10 and 11 to the negative terminal 4. A high magnitude resistor 44 is connected in shunt with the capacitor 32 to permit a full discharge of the capacitor during non-operating times of the oscillator 16.

The transistor 42 is actuated in its switching mode so that when it is in a conducting condition substantially no potential drop appears thereacross. To insure such a switching action a diode 43 is connected between the resistor 40 and the emitter of the transistor 42 and a resistor 45 is connected from the common connection of the resistor 40 and diode 43 to the negative D.C. terminal 4 through a switching device 54 which may be a transistor. When the transistor 42 is fully conducting the rate of charging of the capacitor 32 is determined by the relative magnitudes of the resistance of the resistor 40 and the capacitance of the capacitor 32. To vary the operating frequency of the oscillator 16, the resistor 40 may be made variable.

In order that the full magnitude of the source potential does not appear across the transistor 42 when the transistor is in its circuit interrupting state, a Zener diode 46 is connected in series with the resistor 40 and in shunt with the transistor 42 and capacitor 32. The Zener diode 46 is selected such that its breakover voltage is not greater than the $V_{ceo}$ voltage of the transistor which voltage is less than the voltage between the terminals 2 and 4. The Zener diode 46 in such a combination will pass sufficient current through the resistor 40, which now acts as a voltage dropping device, to limit the collector to emitter voltage across the transistor 42 to the breakover voltage of the Zener diode 46 and thus permit the use of a less expensive transistor that would be necessary if it were required to support the higher voltage.

The magnitude of resistance of resistor 44 is high so that only a very small proportion of the current passed by the transistor 42 during oscillation of the oscillator 16 will flow therethrough. This permits the use of a transistor of lesser current capacity. By connecting the diode 46 in shunt with the resistor 44, the voltage dropping current which flows through the resistor 40 does not flow through the resistor 44 and the capacitor will remain fully discharged.

The oscillating periods of the oscillator circuit 16 are controlled by means of a control device 48. The device 48 may be manually operated or it may be sensitive to any desired quantity. The device 48 provides a turn-on signal when it is desired to energize the load 1. For this purpose, the device is provided with the energizable output conductors 50 and 52 connected between the base and emitter of the control transistor 54 which controls the base current through the transistor 42. The base of the transistor 42 is connected through the usual current limiting resistor 56, the collector-emitter circuit of transistor 54, and the conductors 10 and 11 to the negative terminal 4. A capacitor 57 may be connected between the collector and emitter of the transistor 54 to reduce any disturbance due to noise from the device 48.

It is believed that the remainder of the details of construction may be best understood by reference to the description of operation which is as follows: Assuming a condition in which no base drive signal is applied to the transistor 54 from the control device 48, the transistor 54 will be nonconducting and no base drive current will flow in the transistor 42 which will remain nonconductive. No charging current flows to the capacitor 32 and the switch device 6 will be maintained nonconducting to hold the inductive load 1 deenergized. When the control device 48 supplies base drive to the transistor 54, the transistor conducts and base current flows through the transistor 42 from the positive D.C. terminal through conductor 38, resistor 40, emitter to base in the transistor 42, resistor 56, collector to emitter in the transistor 54, conductors 11 and 10 to the negative D.C. terminal 4. Preferably, the signal output of the control device 48 is sufficient to cause saturation of both of transistors 42 and 54 to permit charging of the capacitor 32 at a rate determined primarily by the resistor 40 to a value sufficient to breakover the four layer diode 28.

When diode 28 breaks over, the potential thereacross decreases to a value considerably below the breakover potential and nearly all of the potential to which the capacitor has been charged is available to energize the transformer 18. A surge of current flows through the primary winding 26 and induces a voltage pulse in the secondary winding 20. This pulses the gate of the controlled rectifier 6 causing it to conduct and establish current flow from the positive terminal 2 through the switch device 6, the inductive load 1 and conductor 10 to the negative terminal 4. Due to the inductance of the load 1, this current builds up gradually and may not reach the critical value before the gate pulse terminates. It is quite true that if the gate pulse applied to the device 6 remains on long enough the current flow through the device 6 and inductive load 1 will reach the predetermined critical value and the switch 6 will continue to remain conductive when the gate pulse terminates. If, however, the critical minimum current flow is not reached before the pulse terminates the switch device 6 will revert to its nonconducting state.

The length of the firing pulse produced by the oscillator 16 is an inverse function of its operating frequency and is a direct function of the charging time of the capacitor 32. Therefore, if the interval between the turn-on time of the oscillator 16 by the control device 48 and the energization of the load 1 is to be kept to a minimum, the oscillator must operate at a relatively high frequency to maintain a short charging time for the capacitor 32. This reduces the pulse time to an interval insufficient to permit current through the inductive load to buildup to the critical minimum sustaining magnitude of the device 6.

To insure an increase of the current flow through the switch device 6 to the critical value during the pulse time, the capacitor 12 is connected between the output terminal 8 and the conductor 10 in series with the resistor 14. This provides a circuit, shunting the inductive load 1, having a high initial current which permits the attaining of the minimum critical current magnitude substantially instantaneously. The magnitude of the capacity of capacitor 12 is so chosen with respect to the voltage between the terminals 2 and 4 and with respect to the inductance of the load 1, that current flow through the switch device 6 will reach the critical minimum magnitude substantially immeditaely and remain at or above this critical magnitude.

A suitable frequency of the oscillator 16 to provide a rapid energization of the load 1 in response to the actuation of the device 48 is 4 per millisecond or a frequency of 4,000 cycles per second. With such a frequency the duration of the gate pulse will be approximately 12 microseconds.

A suitable range of values for the elements to provide the desired results, with a voltage of E volts supplied to the input terminals 2 and 4 and with a load resistance of R ohms and inductance of L henrys, are as follows:

| Element: | | Value |
|---|---|---|
| Load, E/R | amps | .25 |
| Load, L/R | amps | .001 |
| Capacitor 12 | mfd | 2 |
| Capacitor 32 | mfd | .5 |
| Capacitor 57 | pf | 150 |
| Device 6 | | 2N1850A |
| Shockley diode 28 | v. breakover | 20 |
| Transistor 42 | | 2N1131 |
| Zener diode 46 | v. breakover | 33 |
| Resistor 14 | ohms | 470 |
| Resistor 25 | do | 27 |
| Resistor 40 | do | 2,800 |
| Resistor 44 | do | 22,000 |
| Resistor 45 | do | 22,000 |
| Resistor 56 | do | 4,700 |

Although the invention has been described with reference to a single embodiment thereof numerous modifications are possible and it is desired to cover all modifications falling within the spirit and scope of the invention.

What is claimed and is desired to be covered by United States Letters Patent is as follows:

1. In an electrical network, a pair of terminals between which a predetermined voltage is to be established, a switching device having current conducting and current interrupting conditions and being ineffective to support more than a critical voltage thereacross when said device is in said current interrupting condition, said predetermined voltage being greater than said critical voltage, a chargeable device, an impedance device connected in parallel with said chargeable device through a continuously conductive circuit, an impedance element, first circuit means connecting said switching device to one of said terminals and including said impedance element, second circuit means connecting said switching device to the other of said terminals and including said shunt connected devices, said first and second circuit means providing a charging circuit for said chargeable device, said charging circuit being substantially free of impedance except for the impedance of said impedance element, and a breakover diode connected in shunt with said devices and in series with said element between said terminals, the voltage so established by said breakover diode across said switching device with said predetermined voltage at said terminals and with said switching device in said current interrupting condition being not greater than said critical voltage of said switch device.

2. In an electrical network a pair of power terminals adapted to be energized from a source of potential, a semiconductor switching device having a pair of connections defining a main circuit and a control circuit for controlling the initiation of current flow through said main circuit, said device having a maximum potential which can be applied between said connections without causing a failure of said device, a first resistor, means connecting said resistor between one of said connections and one of said terminals, a capacitor, means connecting said capacitor between the other of said connections and the other of said terminals to provide a charging circuit therefor extending between said power terminals, said charging circuit being substantially free of impedance except that of said first resistor, a second resistor, means connecting said second resistor in shunt with said capacitor, a voltage regulating device characterized by the fact that it maintains a substantially constant regulated voltage thereacross when conducting, means connecting said regulating device in series with said first resistor and in shunt with said switching device and said second resistor and said capacitor, a pulsed network, a breakover switch device characterized by the fact that it has an initial condition in which the circuit therethrough is substantially interrupted when the voltage thereacross is below a predetermined critical value and is rendered in a conducting condition when said voltage thereacross reaches said critical value, the voltage across said breakover switch device when it is in its said conducting condition being a minimum value which is a fraction of said critical value, said breakover switch device remaining at such minimum value as long as current flows therethrough and returning to said initial condition when current flow therethrough reaches a minimum magnitude, means connecting said network to said capacitor and including said breakover switch device, said critical value being less than said constant regulated voltage.

3. The combination of claim 2 in which said semiconductor switching device is a transistor, said voltage regulating device is a Zener diode, said breakover switch device is a Shockley device, and the magnitude of the voltage of the source of potential connected to said power terminals is greater than the magnitude of the maximum potential which can be applied between said connections without causing a failure of said transistor.

4. A timing network comprising a pair of input terminals rated to be energized with a unidirectional potential of a first magnitude, a voltage regulating means adapted to provide a high impedance to current flow at voltages below a second predetermined magnitude and to present a substantially lower impedance to current flow at voltages thereacross above said second magnitude whereby said means is effective to prevent the establishment of a voltage thereacross substantially above said second magnitude, a first impedance device, a chargeable device, a switch device, said switch device being effective to support a third voltage thereacross, the magnitude of said third voltage being less than said first magnitude, first circuit means connecting said devices in series circuit between said terminals to provide a charging circuit for said chargeable device, said charging circuit being substantially free of impedance except for the impedance of said first impedance device, said devices being so arranged in said series circuit that said switch device and said chargeable device are each separated from one of said input terminals by said impedance device, second circuit means connecting said voltage regulating means in shunt circuit with the portion of said first circuit containing said switch device and said chargeable device and in series circuit with said impedance device between said input terminals, said second magnitude being no greater than said third magnitude.

5. The combination of claim 4 in which there is provided a voltage sensitive breakover apparatus connected in shunt with said chargeable device, said brakeover apparatus having the characteristic of remaining in a nonconducting condition as the voltage thereacross rises to a fourth magnitude at which time said breakover apparatus becomes conducting, a control apparatus connected to said breakover apparatus and rendered effective as a consequence of the conduction of said breakover apparatus, said fourth magnitude being less than said second magnitude.

6. The combination of claim 5 in which there is provided a second impedance device connected in shunt with said chargeable device, the magnitude of the impedance of said second impedance device being substantially greater than the magnitude of the impedance of said first impedance device.

7. The combination of claim 6 in which said impedance devices are resistors, said voltage regulating means is a Zener diode, said chargeable device is a capacitor, said switch device is a transistor, said voltage sensitive apparatus is a Shockley diode, said control apparatus is connected in series with said voltage sensitive apparatus, said switch device during its conducting period being devoid of any substantial impedance, the portion of said second circuit means which is in series between said input terminals containing solely said first impedance device and said voltage regulating means, the portion of said second circuit means which is in shunt with said switch device and said chargeable device being devoid of any substantial magnitude of impedance whereby the magnitude of the voltage across said voltage regulating means is not substantially greater than the voltage across said chargeable device during conducting periods of said switch device.

References Cited by the Examiner

UNITED STATES PATENTS

| | | | |
|---|---|---|---|
| 2,905,835 | 9/1959 | Wray | 307—88.5 |
| 3,050,611 | 8/1962 | Kamide | 307—88.5 |
| 3,105,179 | 9/1963 | Young et al. | 307—88.5 |
| 3,111,008 | 11/1963 | Nelson | 62—3 |
| 3,146,392 | 8/1964 | Sylvan | 307—88.5 |
| 3,217,269 | 11/1965 | Rowley et al. | 307—88.5 |

FOREIGN PATENTS 940,306 10/1963 Great Britain.

OTHER REFERENCES

RCA Technical Notes, No. 260, June 1959, (1 sht.) "Pulse Count Circuit," by Hugh W. Stewart, 307–88.5/SNR.

DAVID J. GALVIN, *Primary Examiner.*

J. ZAZWORSKY, *Assistant Examiner.*